No. 782,670. PATENTED FEB. 14, 1905.
A. C. LEAHY.
FASTENER.
APPLICATION FILED NOV. 5, 1904.

Witnesses
F. H. Kliman
William J. Firth.

Annie C. Leahy
Inventor
By her Attorney
Henry Connett

No. 782,670. Patented February 14, 1905.

UNITED STATES PATENT OFFICE.

ANNIE C. LEAHY, OF NEW YORK, N. Y.

FASTENER.

SPECIFICATION forming part of Letters Patent No. 782,670, dated February 14, 1905.

Application filed November 5, 1904. Serial No. 231,576.

*To all whom it may concern:*

Be it known that I, ANNIE C. LEAHY, a citizen of the United States, residing in the borough of Brooklyn, in the county of Kings, in the city and State of New York, have invented certain new and useful Improvements in Fasteners, of which the following is a specification.

This invention relates to fasteners such as are employed for securing mailing-envelops, for securing together sheets of paper, and for like uses; and it is herein illustrated as embodied in a fastener for a mailing envelop or bag.

The object of the invention is to provide a two-pronged fastener made from sheet metal having one prong longer than the other, for reasons that will be hereinafter explained.

The fastener will be formed in one piece and will have, by preference, its securing eyelet or clips formed integrally with the prongs.

Figure 2:
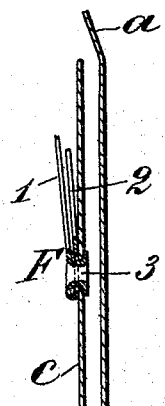
Figure 1:
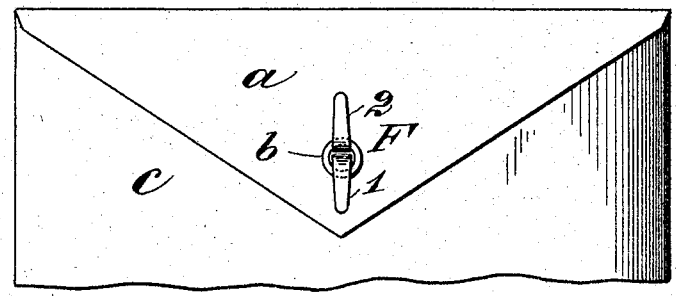
Figure 3:
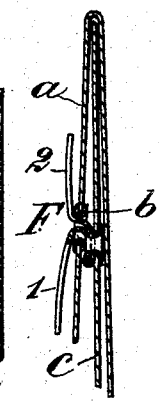
Figure 4:
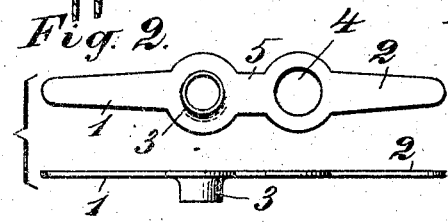
Figure 5:
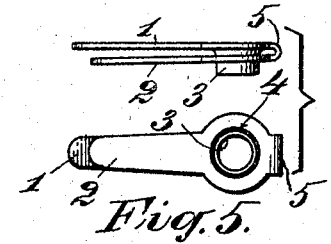
Figure 6:
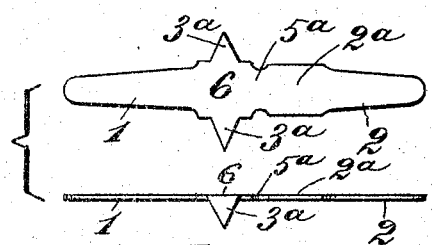
Figure 7:
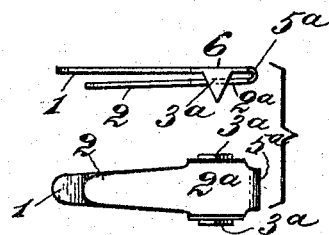
Figure 8:
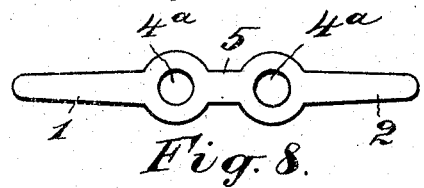
Figure 9:
Figure 10:
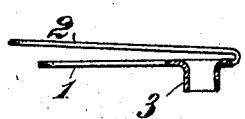

In the accompanying drawings, which illustrate the invention, Figure 1 shows a part of a mailing-envelop with one of the fasteners in use thereon; and Figs. 2 and 3 are sectional views of the envelop, Fig. 2 showing the fastener secured to the ply of the envelop ready for use and Fig. 3 showing the fastener in use as in Fig. 1. Figs. 4 and 5 illustrate the preferred form of the fastener on a larger scale. The former includes an under side and edge view of the fastener before it is bent, and the latter includes two similar views showing the fastener bent into form and ready for sale. Figs. 6 and 7 are similar views to Figs. 4 and 5, showing a form of the fastener wherein spurs or clips are employed in place of an eyelet. Figs. 8 and 9 illustrate a fastener similar to that seen in Figs. 4 and 5, but wherein the eyelet for securing the fastener is non-integral. Fig. 10 illustrates a form which is the same as Fig. 4, except in some minor details to be hereinafter described.

In the first three figures of the drawings, $a$ designates the flap of an envelop or paper bag, $b$ an eyelet or reinforced aperture therein through which the prongs of the fastener pass, and $c$ the ply of the envelop to which the fastener is secured. In these views, F designates the fastener as a whole.

Referring now to Figs. 4 and 5, the preferred construction of the fastener and the manner of making it will be described. From suitable sheet metal, as brass, is formed a piece, as seen in Fig. 4, which comprises a longer outer prong 1, a shorter under prong 2, an eyelet 3 at the base of the outer prong, an aperture 4 at the base of the inner prong, said aperture being large enough for the eyelet to pass through freely, and a narrow tie or neck 5. The portion between the prongs in Fig. 4 forms the base of the fastener. This piece constitutes the entire fastener and has only to be folded at the neck 5, with the eyelet passing through the aperture 4, as seen in Fig. 5, to be ready for sale. This fastener is applied by passing the eyelet through an aperture in the ply of the envelop or bag and clenching it in a known manner with an eyelet set. It will then appear substantially as seen in Fig. 2. To secure the flap of the envelop, the latter is folded down over the ply of the envelop-body in the usual way, the superposed prongs of the fastener passed through the eyelet in the flap, and the longer outer prong 1 back to the position seen in Figs. 1 and 3. The object in making the outer or exterior prong of the superposed pair longer than the inner one is that it facilitates separating them by enabling the user to take under the end of the outer prong and bend it upward and over. Where the prongs are of equal length and fit closely together, it is difficult to separate them.

The fastener may be made as shown in Figs. 6 and 7, wherein the prongs 1 and 2 spring from a base-plate 6, on which are formed two securing clips or spurs $3^a$ to perform the function of the eyelet 3. The upper view in Fig. 6 shows these clips before they are bent down at right angles to the base-plate 6. The prong 2 has recesses in its edges to form a narrower neck $5^a$ to facilitate bending, and it will have, by preference, a broad part $2^a$, which when this prong is bent under the plate, as in Fig. 7, takes between the securing spurs or clips $3^a$.

As in the construction described, the outer prong 1 projects out beyond the inner prong when the latter is bent under, as in Fig. 7.

Figs. 8 and 9 show a form of the fastener which is the same as that seen in Figs. 4 and 5, except that there are two holes 4ª in the base and the eyelet 3ᵇ is non-integral.

Fig. 10 illustrates a form of the fastener where the prong 2 is bent back over the prong 1 and the integral eyelet 3 does not pass through it. In this form the prong 2, which is the outer and upper prong, extends out beyond the lower prong 1. In this construction the portion from which the eyelet 3 is formed constitutes the base of the fastener. In all cases it will be the outer and upper prong which extends out the farthest.

Having thus described my invention, I claim—

1. A fastener, having a base to rest on the surface of the material to which the fastener is to be secured, means for securing said base to said material, and two prongs connected with the base, said prongs being superposed and substantially parallel with each other, the upper prong extending out beyond the end of the other.

2. A fastener, having a base to rest on the surface of the material to which the fastener is to be secured, means for securing said base to said material, a prong connected with and in substantially the same plane with said base, and another prong also connected with the base and bent over the latter and the first-named prong into a position over the latter so that the two prongs are superposed, the upper prong extending out beyond the end of the lower prong.

3. A fastener, having two superposed and integrally-connected prongs, one extending out beyond the other for convenience in separating them, said fastener having an integral securing-eyelet 3 which extends through an aperture 4 in the fastener, as described.

4. A sheet-metal fastener, consisting of a folded piece having two prongs 1 and 2, an integral eyelet 3, and an aperture 4 through which the eyelet passes, substantially as set forth.

5. A fastener, having a base to rest on the surface of the material to which the fastener is to be secured and provided with integral securing means on said base, a prong which springs integrally from said base and lies in substantially the same plane therewith, and another prong which springs integrally from the opposite side of said base and is bent back over the latter and over the first-named prong, said prongs being superposed and the upper prong extending out beyond the end of the lower prong.

In witness whereof I have hereunto signed my name, this 3d day of November, 1904, in the presence of two subscribing witnesses.

ANNIE C. LEAHY.

Witnesses:
  HENRY CONNETT,
  WILLIAM J. FIRTH